(12) United States Patent
Ruedi et al.

(10) Patent No.: US 7,843,503 B2
(45) Date of Patent: Nov. 30, 2010

(54) SYSTEM AND METHOD FOR READING INFORMATION IN A SET OF ELECTRONIC COMPONENTS CONNECTED TO A COMMUNICATION BUS, AND APPLICATION TO READING A MATRIX OF PIXELS

(75) Inventors: Pierre-Francois Ruedi, Hauterive (CH); Stève Gyger, Neuchatel (CH)

(73) Assignee: CSEM Centre Suisse d'Electronique et de Microtechnique SA - Recherche et Developpement, Neuchatel (CH)

( * ) Notice: Subject to any disclaimer, the term of this patent is extended or adjusted under 35 U.S.C. 154(b) by 1093 days.

(21) Appl. No.: 11/541,687

(22) Filed: Oct. 3, 2006

(65) Prior Publication Data

US 2007/0079035 A1    Apr. 5, 2007

(30) Foreign Application Priority Data

Oct. 4, 2005    (EP) ................... 05292057

(51) Int. Cl.
*H04N 3/14*    (2006.01)
*H04N 5/335*    (2006.01)
*H01L 27/00*    (2006.01)

(52) U.S. Cl. ............ 348/302; 348/303; 250/208.1

(58) Field of Classification Search ......... 348/296–297, 348/302–304

See application file for complete search history.

(56) References Cited

U.S. PATENT DOCUMENTS

| 5,404,556 | A | 4/1995 | Mahowald et al. |
| 6,253,161 | B1 | 6/2001 | Arias-Estrada |
| 6,660,989 | B2 * | 12/2003 | Guo et al. ............... 250/208.1 |
| 7,106,367 | B2 * | 9/2006 | Sarwari .................. 348/222.1 |
| 7,630,008 | B2 * | 12/2009 | Sarwari .................... 348/296 |
| 2003/0081134 | A1 * | 5/2003 | Luo et al. .................. 348/308 |

FOREIGN PATENT DOCUMENTS

EP    1 150 250    10/2001

* cited by examiner

*Primary Examiner*—Kelly L Jerabek
(74) *Attorney, Agent, or Firm*—Jacobson Holman PLLC

(57) ABSTRACT

A device for reading information in a set of electronic components connected to a communication bus in order to send that information over the communication bus includes means for reading values held in at least some of the electronic components holding a value to be sent and an arbiter circuit for successively sending the read values over the communication bus. The arbiter circuit includes means for circulating between the electronic components holding a value to be sent a single token authorizing sending of the read values.

11 Claims, 3 Drawing Sheets ically all of
the components that at a given time are holding a value to be
sent. As a result of this, a component requesting access to the
communication bus continuously, for example following a
fault, could compromise the correct operation of this commu-
nication principle. On the other hand, sequential selection of
components requiring access to the communication bus at a
given time ensures fair sharing of that communication bus.

The invention seeks to solve the above problem by provid-
ing a device and a corresponding method that ensure system-
atic selection of all electronic components holding informa-
tion to be sent, at the same time as maintaining a zero risk of
collisions.

SYSTEM AND METHOD FOR READING INFORMATION IN A SET OF ELECTRONIC COMPONENTS CONNECTED TO A COMMUNICATION BUS, AND APPLICATION TO READING A MATRIX OF PIXELS

CROSS-REFERENCE TO RELATED APPLICATIONS

This application is based on European Patent Application No. EP05292057.6 filed Oct. 4, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a device for reading information in a set of electronic components connected to a communication bus in order to send that information over the communication bus. It also relates to a corresponding method and to an application of that method to reading information contained in a matrix of pixels.

More precisely, the invention relates to a device for reading information in a set of electronic components connected to a communication bus in order to send that information over the communication bus, the system including means for reading values held in at least some of the electronic components holding a value to be sent and an arbiter circuit for succes-sively sending the read values over the communication bus.

2. Description of the Prior Art

Published European patent EP 1 150 250 describes a device for reading information in a set of electronic components connected to an asynchronous communication bus and for coding that information in order to send it over the commu-nication bus.

More specifically, the device described in the above patent reads values contained in a matrix of pixels and time codes those values. A signal that is distributed to all the pixels transfers a reference value that changes over time. This reference value is compared to a local value contained in each pixel. If the reference value and the local value are equal, the pixel sends a pulse over the asynchronous communication bus. The pulse codes the position of the pixel in the matrix and the time of sending the pulse codes the local value contained in the pixel.

The major drawback of the mode of transmission described in the above patent is that values contained in pixels holding a value to be sent are sent without arbitration, causing colli-sions on the asynchronous transmission bus. This leads to a loss of information. A first solution to this problem is to maintain activity on the asynchronous communication bus at a relatively low value, in practice less than 10%, in order to limit the risk and therefore the occurrence of collisions.

In the more general field of sending information extracted from electronic components connected to a communication bus, published U.S. Pat. No. 5,404,556 describes another solution. According to that patent, successive sending of the read values over the asynchronous communication bus is subject to arbitration. To be more precise, arbitration is effected by means of a binary decision tree that at any given time selects a single electronic component from all the elec-tronic components that are holding a value to be sent and authorizes that component to send its value on the asynchro-nous communication bus at that time.

The above patent therefore solves the problem of colli-sions. However, the order in which the electronic components are authorized to send the value they are holding is indeter-minate; it depends on the structure of the binary decision tree and on the propagation delays internal to that binary tree. Thus the method described cannot process sequentially all of

SUMMARY OF THE INVENTION

Thus the invention consists in a device for reading infor-mation in a set of electronic components connected to a communication bus in order to send that information over the communication bus, the device including means for reading values held in at least some of the electronic components holding a value to be sent and an arbiter circuit for succes-sively sending the read values over the communication bus, which arbiter circuit includes means for circulating between the electronic components holding a value to be sent a single token authorizing sending of the read values.

Accordingly, the fact that there is only one token authoriz-ing sending of read values ensures that no collisions can occur on the communication bus. Also, circulating this single token between the components holding a value to be sent provides a simple way to guarantee that all the components holding information to be sent are systematically selected by the circulating token.

In practice, the arbiter circuit may include at least one shift register.

This architecture uses synchronous sequential logic based on D flip-flops and represents in material terms the circulation of the single authorization token.

More precisely, if the electronic circuits constitute a matrix the arbiter circuit may include a vertical shift register includ-ing a block for each row of the matrix and a horizontal shift register including a block for each column of the matrix.

In this type of structure, dividing the shift register into two registers, one of which is vertical and the other of which is horizontal, makes it unnecessary to provide a D flip-flop for each cell.

Each block may include an indicator of a value to be sent which takes a predetermined value if the corresponding block has a value to be sent, so that said authorization token goes, on each rising edge of a clock signal provided by said arbiter circuit, from a block which has sent a value to a next block which has a value to be sent.

The invention also consists in a device for reading infor-mation in a set of electronic components connected to a communication bus according to a predetermined order in order to send said information over said communication bus, said device including means for reading values held in at least some of said electronic components holding a value to be sent and an arbiter circuit for successively sending the read values over said communication bus, which arbiter circuit includes an element for circulating between said electronic compo-nents holding a value to be sent a single token authorizing sending of said read values, said element circulating said authorization token systematically and sequentially from electronic component to electronic component from the beginning to the end of said set in said predetermined order.

The invention also consists in a device for reading information in a matrix of electronic components connected to a communication bus in order to send said information over said communication bus, said device including means for reading values held in at least some of said electronic components holding a value to be sent and an arbiter circuit for successively sending the read values over said communication bus, which arbiter circuit includes means for circulating from row to row of said matrix, and then for each row from column to column of said matrix, between said electronic components holding a value to be sent a single token authorizing sending of said read values.

The invention further consists in a method of reading information in a set of electronic components connected to a communication bus in order to send the information over the communication bus, the method including:

reading values contained in at least some of the electronic components holding a value to be sent, and an arbitration for successively sending the read values over the communication bus, the arbitration including the circulation between the electronic components holding a value to be sent of a single token authorizing sending of the read values.

More precisely, a method of the invention of reading information may include the following steps:

a value held in each electronic component is compared to a time reference signal in the form of a decreasing ramp;

a request for a value to be sent is generated for an electronic component if at a given time the value of the time reference signal is equal to the value held in the electronic component; and the authorization token circulates between all the electronic components for which a request for a value to be sent is generated, the value of the time reference signal being maintained constant until the token has been circulated between all of the electronic components holding that value to be sent.

Thus arbitration by circulating a single token is compatible with a method of reading information that time codes the values to be sent.

The invention also consists in an application of a reading method according to the invention to reading information contained in a matrix of pixels each of which constitutes an electronic component of the matrix, wherein said circulation of said authorization token is performed from row to row of said matrix, and then for each row from column to column of said matrix.

In the above application, it is particularly beneficial to connect the pixels of the matrix to a communication bus, in particular to be able to use a time coding method to read information contained in the set of pixels, at the same time as eliminating the risk of generating collisions when sending information over the communication bus.

Finally, the invention also consists in a method of reading information in a set of electronic components connected to a communication bus according to a predetermined order in order to send said information over said communication bus, said method including:

reading values contained in at least some of said electronic components holding a value to be sent, and an arbitration for successively sending the read values over said communication bus, said arbitration including the circulation between the electronic components holding a value to be sent of a single token authorizing sending of said read values, said circulation being performed systematically and sequentially from electronic component to electronic component from the beginning to the end of said set in said predetermined order.

The invention will be better understood in the light of the following description, which is given by way of example only and with reference to the appended drawings.

DETAILED DESCRIPTION OF THE PREFERRED EMBODIMENTS

Figure 1:
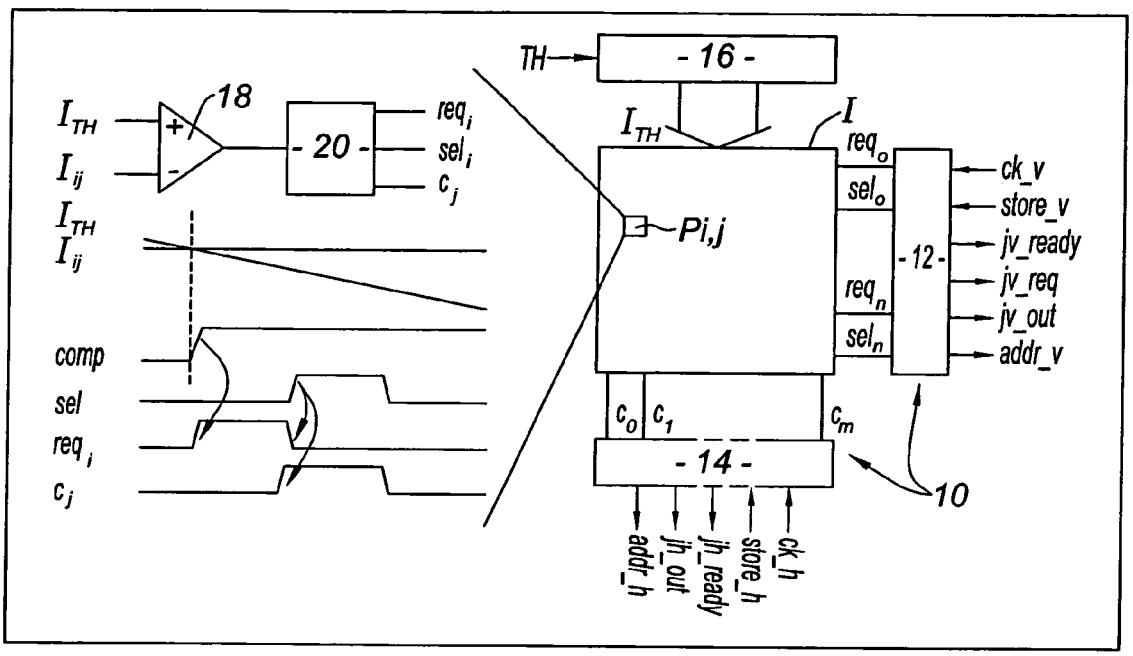
FIG. 1 is a diagram of the general structure of an information reading device of the invention.

As can be seen in FIG. 1, one embodiment of an information reading device of the invention includes a matrix I of pixels $p_{i,j}$ in which each pixel holds a value $I_{i,j}$ defining an intensity of that pixel, for example. The matrix I has n rows and m columns.

Each pixel $p_{i,j}$ is connected to a common communication bus (not shown) for sending the value that it holds, if necessary. For example, each pixel is a sensor and includes its own means for reading the value $I_{i,j}$.

The reader system includes an arbiter circuit 10 for sending the read values over the communication bus successively without colliding.

In the FIG. 1 example, in which the pixels constitute a matrix, the arbiter circuit 10 includes a first (vertical) arbiter circuit 12 including a vertical shift register comprising a D flip-flop for each row of the matrix and a second (horizontal) arbiter circuit 14 including a horizontal shift register comprising a D flip-flop for each column of the matrix. The structure and operation of these shift registers are described in detail with reference to FIGS. 2 and 3.

All the pixels $p_{i,1}, \ldots p_{i,m}$ of the same row i of the matrix I are connected to the first (vertical) arbiter circuit 12 to send a signal $req_i$ to the first (vertical) arbiter circuit 12 and receive a signal $sel_i$ from the first (vertical) arbiter circuit 12.

The signal $req_i$ assumes a non-zero value (for example a normalized value of "1") when one or more of the pixels of the row i is holding a value to be sent over the communication bus and a zero value if none of the pixels of the row i is holding a value to be sent. The signal $sel_i$ assumes a non-zero value (for example a normalized value of "1") when the pixel or each pixel of the row i holding a value to be sent is authorized to send its value on the communication bus and a zero value otherwise. The signal $sel_i$ can assume the value 1 only if the signal $req_i$ has the value 1 and when the value of the signal $sel_i$ changes from 1 to 0 (value(s) of the row i are sent on the communication bus), $req_i$ also assumes the value 0.

All the pixels $p_{1,j}, \ldots, p_{n,j}$ of the same column j of the matrix I are connected to the second (horizontal) arbiter circuit 14 to send a signal $c_j$ to the second (horizontal) arbiter circuit 14.

The signal $c_j$ assumes a non-zero value (for example a normalized value of "1") if the pixel $p_{i,j}$ is holding a value to send on the communication bus and the signal $sel_i$ assumes the value 1; it assumes a zero value when the signal $sel_i$ assumes the value 0.

To time code the values contained in the pixels of the matrix I, like the system described in European patent application EP 1 150 250, the information reader device further includes a system 16 for distributing a reference value $I_{TH}$ based on a time reference signal TH of decreasing ramp shape.

The principle of operation of the device at the level of one pixel is shown in the left-hand portion of FIG. 1.

Each pixel $p_{i,j}$ includes a comparator 18 for continuously comparing the value $I_{i,j}$ that it contains to the reference value $I_{TH}$.

The result comp of this comparison is supplied to a decision electronic circuit 20 whose structure is described in detail with reference to FIG. 5. The signal comp assumes a non-zero value (for example a normalized value of "1") if the values $I_{TH}$ is smaller than or equal to $I_{i,j}$ and a zero value otherwise.

The decision electronic circuit 20 receives the signals comp and $sel_i$ and sends the signals $req_i$ and $c_j$. It is designed to change the value of the signal $req_i$ to 1 if the signal comp has the value 1 (to request access to the communication bus). In response to a request sent in the form of the signal $req_i$ having the value 1, the signal $sel_i$ sent to the electronic decision circuit 20 and then the signal $c_j$ sent by the decision electronic circuit 20 assume the value 1. At this moment, the request signal $req_i$ returns to the value 0. Finally, when all the values to be sent from the pixels of the row i have been sent over the communication bus, the signals $sel_i$ and $c_j$ assume the value 0.

Thanks to the first and second arbiter circuits 12 and 14, the rows i for which the signal $req_i$ has the value 1 are selected successively, allowing the pixels of these rows to access the communication bus successively. Each of the two shift registers that they include manages the circulation between the pixels holding a value to be sent of a single token authorizing sending of the read value (see below). The row token circulates in the (vertical) row shift register until a row is found including one or more pixels holding information to be sent, after which the column token circulates in the (horizontal) column shift register to determine which pixel or pixels have information to be sent and to send said information, i.e. to send the value of the pixel(s) concerned.

For circulating electronically the single authorization token, the set of electronic components connected to the communication bus must be a priori ordered, the predetermined order of such electronic components thus defining a systematic and sequential circulation of the authorization token, from electronic component to electronic component, from the beginning to the end of the set. The authorization token itself is the electronic embodiment of a right to send information. The order of available information processing is therefore imposed by the predetermined order of the electronic components in the set. Thus, for an application of reading information contained in a matrix of pixels, the authorization token circulates in the matrix from the beginning to the end, i.e. from row to row of said matrix, and then for each row from column to column of said matrix, without necessitating the transmission of complete pixels addresses from which said information is read (however, in the embodiment which will be shown in reference to FIG. 2, the transmission of row addresses is necessary).

Figure 2:
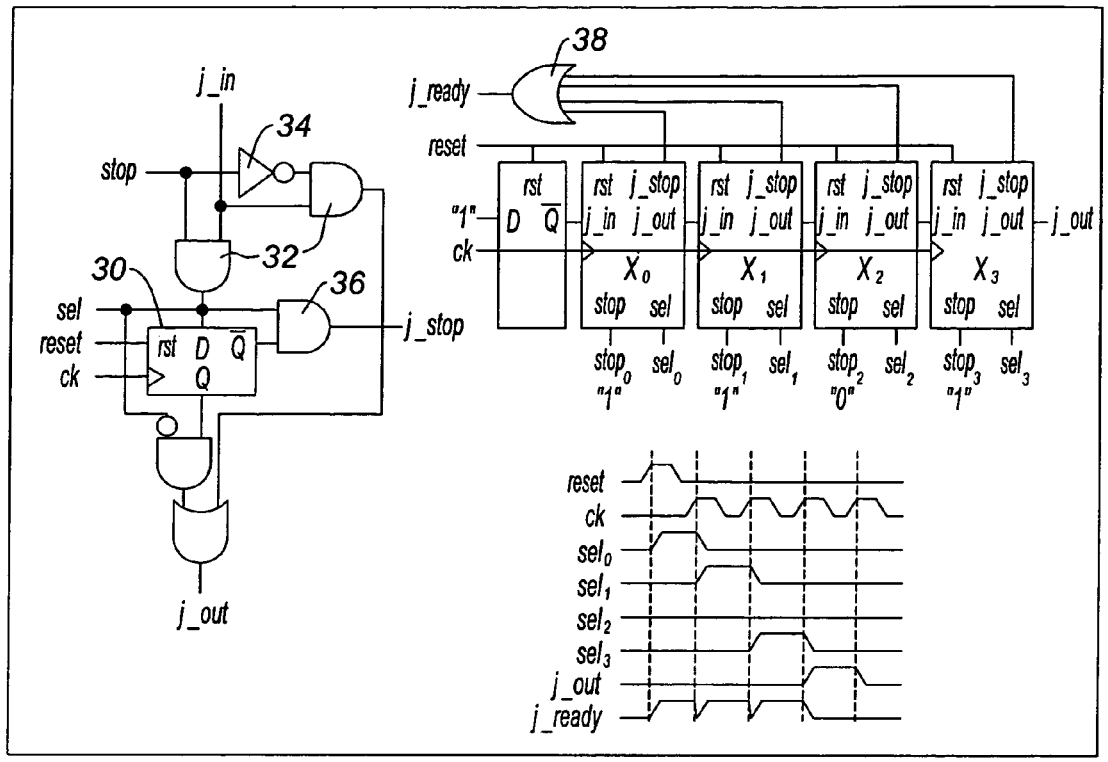
FIGS. 2 and 3 are diagrams of an arbiter circuit that may be envisaged for use in the FIG. 1 device.

FIG. 2 shows the general principle of the token circulated from one pixel (or electronic component) to another using a shift register consisting of D flip-flops and associated logic.

As shown in the left-hand portion of FIG. 2, a signal j_in indicating the availability or unavailability of the token for a given pixel, according to its value 1 or 0, is routed either to the input of a corresponding D flip-flop 30 or directly to the output j_out of that D flip-flop 30 by means of AND logic gates 32 and an inverter 34, as a function of the 1 or 0 value of a stop signal indicating if the pixel is holding a value to be sent.

If the signal j_in has the value 1, the token at the input of the D flip-flop 30 is stored in that D flip-flop on the rising edge of a clock signal ck that is also supplied to the D flip-flop. The signal at the input of the D flip-flop may also be used as a signal for selecting the corresponding pixel. Thus a selection signal sel is connected directly to the input of the D flip-flop 30.

The signal sel and the signal at the output $\overline{Q}$ of the D flip-flop 30 are fed to the inputs of an AND gate 36 which supplies at its output a signal j_stop that assumes the value 1 when the token is present at the input of the D flip-flop and returns to the value 0 as soon as the token has been sampled, i.e. updated in the memory of the D flip-flop 30.

The right-hand portion of FIG. 2 shows how a shift register in which the token propagates may be produced by cascading blocks ($X_0$ to $X_3$) like that represented in the left-hand portion of FIG. 2.

The block $X_0$ has its input j_in connected to the output $\overline{Q}$ of a D flip-flop that injects the token into the shift register.

To initialize the shift register, a reset signal having the value 1 is sent to a corresponding input of each D flip-flop of the shift register in order for the latter to be reinitialized and for a token to be placed at the input of the first D flip-flop.

In the example shown in FIG. 2, the respective pixels corresponding to the blocks $X_0$, $X_1$ and $X_3$ are holding a value to be sent (the corresponding signals $stop_0$, $stop_1$ and $stop_3$ have the value 1). The pixel corresponding to the block $X_2$ is not holding a value to be sent (the signal $stop_2$ has the value 0).

When a token is placed at the input of the block $X_0$, because the signal $stop_0$ has the value 1, the signal $sel_0$ assumes the value 1. On the first rising edge of the clock signal ck sent to all the D flip-flops of the shift register, the pixel corresponding to the block $X_0$ sends its value over the communication bus and the signal $sel_0$ assumes the value 0, and the token is therefore sent to the input of the block $X_1$. The signal $sel_1$ then assumes the value 1, because the signal $stop_1$ has the value 1. On the next rising edge of the clock signal ck, the pixel corresponding to the block $X_1$ sends its value over the communication bus and the signal $sel_1$ assumes the value 0, so that the token is sent directly to the input of the block $X_3$, because the signal $stop_2$ has the value 0. The signal $sel_3$ then assumes the value 1. More generally, when the signal $sel_i$ has the value 1, the communication bus is available to the pixel corresponding to the block $X_i$.

The propagation time of the token between two blocks $X_i$ corresponding to two pixels holding a value to be sent depends on the number of intermediate blocks. It is therefore necessary to provide a signal j_ready to indicate that the token has stopped at a particular location in the shift register. This signal j_ready is obtained by using an OR gate 38 to combine the signals j_stop of all the blocks $X_i$ of the shift register.

In the FIG. 2 example, the signal at the input of the D flip-flop 30 is used as a signal for selecting the corresponding pixel.

Figure 3:
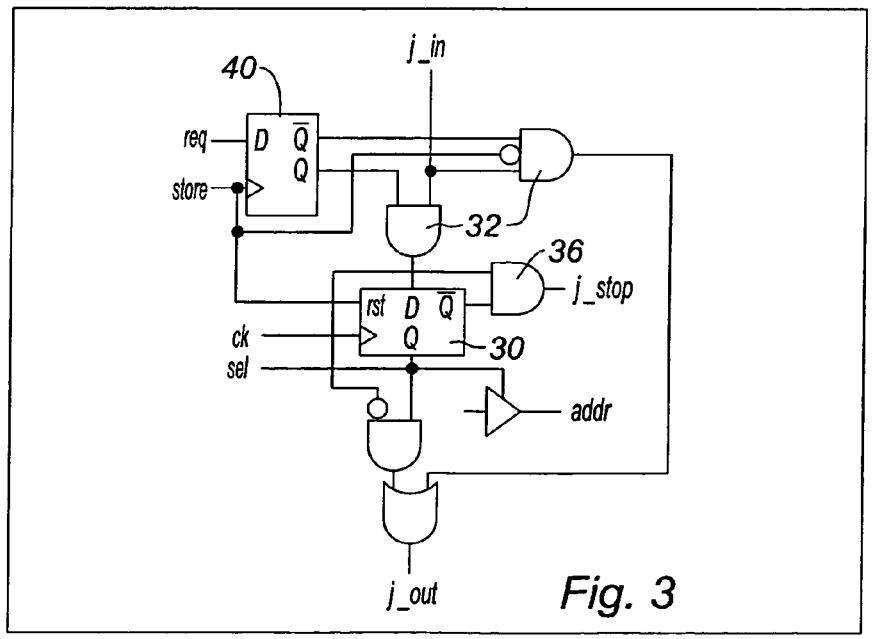

Alternatively, as shown in FIG. 3, the selection signal sel can be connected to the output Q of the D flip-flop 30 (rather than the input).

Furthermore, to integrate a shift register like that described above into each of the first and second arbiter circuits 12 and 14, a D flip-flop 40 is added at the common input of the two AND gates 32 to store the value of the signal req received by the D flip-flop 30 before the passage of the token. Moreover, if the signal sel has the value 1, the pixel corresponding to the D flip-flop 30 codes its address on a specific row addr.

Note also that the shift register described above includes D flip-flops 30 each of which is associated with an electronic component (in this instance a pixel) of the information reader device.

When the electronic components are pixels arranged in a matrix, the D flip-flops 30 of the shift registers of the first and second arbiter circuits 12 and 14 are no longer each associated with one pixel, but instead with a row or a column of the matrix.

This reduces the number of flip-flops 30 needed to n+m instead of n×m.

Figure 4:
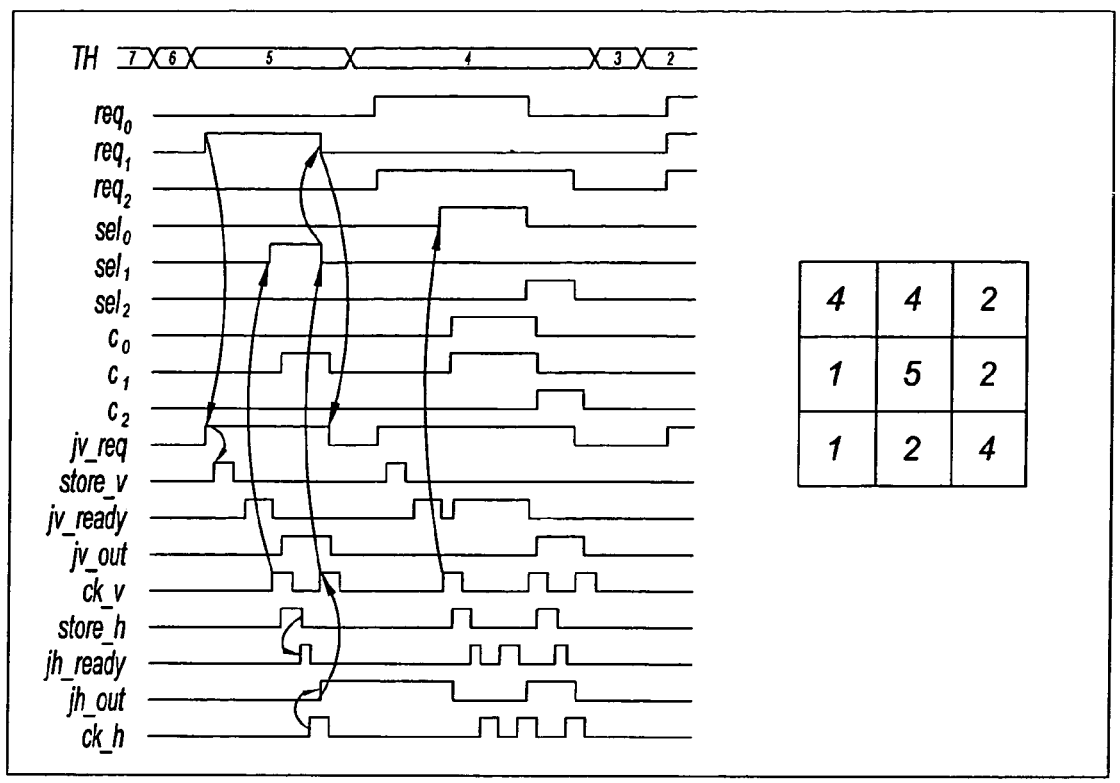
FIG. 4 is a timing diagram showing a concrete example of an information reading method of the invention.

FIG. 4 shows one example of the operation of the system described above for a matrix of 3×3 pixels.

The first (vertical) arbiter circuit 12 exchanges the following signals with a sequencing unit (not shown), as indicated in FIG. 1:

the vertical clock signal ck_v received by the first arbiter circuit 12;

the signal store_v received by the first arbiter circuit 12 activating storage of the signals $req_i$;

the signal jv_ready sent by the first arbiter circuit 12 indicating that the token is stopped at a given location of the shift register of the first arbiter circuit 12;

the signal jv_req sent by the first arbiter circuit 12 indicating if at least one of the signals $req_i$ has the value 1;

the output signal jv_out of the shift register of the first arbiter circuit 12, sent by the first arbiter circuit 12; and the signal addr_v sent by the first arbiter circuit 12 and dedicated to coding vertical addresses.

The second (horizontal) arbiter circuit 14 exchanges the following signals with the sequencing unit (not shown), also as shown in FIG. 1:

the horizontal clock signal ck_h received by the second arbiter circuit 14;

the signal store_h received by the second arbiter circuit 14 activating storage of the signals $c_j$;

the signal jh_ready sent by the second arbiter circuit 14 indicating that the token is stopped at a given location of the shift register of the second arbiter circuit 14;

the output signal jh_out of the shift register of the second arbiter circuit 14, sent by the second arbiter circuit 14; and the signal addr_h sent by the second arbiter circuit 14 and dedicated to coding horizontal addresses.

In the present example, in which the values to be read in the pixels range from 5 to 1, the initial value of the signal TH is 7. Its value decreases progressively for as long as the signal jv_req has the value 0.

When the signal TH has the value 5, the signal $req_1$ assumes the value 1, with the result that the signal jv_req also assumes the value 1, indicating that at least one of the rows i is activated. The reduction in the value of the reference signal TH is then stopped and the signal store_v assumes the value 1.

On the rising edge of the signal store_v, the values $req_i$ are stored in corresponding D flip-flops and a token is placed at the input of the shift register of the first (vertical) arbiter circuit 12. When the value of the signal store_v returns to 0, the token propagates to the D flip-flop corresponding to the row 1 in which it is stopped, because the signal $req_1$ has the value 1. The signal jv_ready assumes the value 1 indicating that the token is stopped, which leads to the generation of a pulse on the signals ck_v and store_h.

On the rising edge of the signal ck_v, the signal $sel_1$ assumes the value 1, with the result that the pixel $p_{1,1}$ activates the signal $c_1$. At the same time, the number of the selected row is coded by the signal addr_v, after which the token propagates to the output of the shift register of the first (vertical) arbiter circuit 12 with the result that the signal jv_out assumes the value 1.

On the rising edge of the signal store_h, a token is placed at the input of the shift register of the second (horizontal) arbiter circuit 14. Then, on the falling edge of the signal store_h, the values $c_j$ are stored in corresponding D flip-flops and the token propagates to the D flip-flop corresponding to the column 1, causing the signal jh_ready to assume the value 1, which generates a pulse in the signal ck_h. On the rising edge of the signal ck_h, the token is sampled by the D flip-flop corresponding to column 1 of the shift register of the second (horizontal) arbiter circuit 14, and the number of that column is coded by the signal addr_h.

At the same time, the token propagates to the output of the shift register of the second (horizontal) arbiter circuit 14 with the result that the signal jh_out assumes the value 1.

On the falling edge of the signal ck_h, the sequencing unit stores the values coded by the signals addr_v, addr_h and TH that code the address and value of the pixel $p_{1,1}$.

The signals jv_out and jh_out having assumed the value 1, the reference signal TH is decremented by one unit and assumes the value 4. The signals $req_0$ and $req_2$ then assume the value 1, with the result that the signals jv_req and store_v assume the value 1. A token is placed at the input of the shift register of the first (vertical) arbiter circuit 12, after the signal store_v assumes the value 1, to select first the row 0 ($sel_0$) and then the row 1 ($sel_2$). For each of the rows selected, the address and value of each of the pixels having the value 4 are sent to the sequencing unit. This process continues until all the values of the matrix of pixels have been read.

Figure 5:
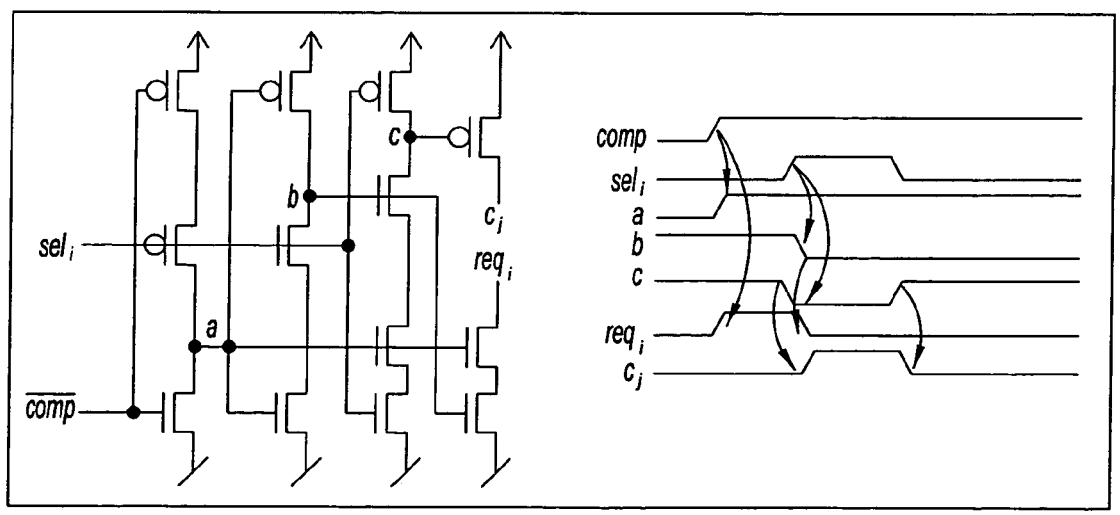
FIG. 5 is a more detailed diagram of the structure of the electronic component 20 of the FIG. 1 information reading device.

The decision electronic circuit 20 (for example the circuit for the pixel $p_{i,j}$) is a transistor circuit that is shown in more detail in FIG. 5 and includes three internal nodes a, b and c.

Initially, the signals comp and $sel_i$ supplied to the decision electronic circuit 20 have the value 0, with the result that the node a has the value 0 and the nodes b and c have the value 1.

When the signal comp assumes the high state value, the node a assumes the value 1 if the signal $sel_i$ has the value 0, with the result that the signal $req_i$ assumes the value 1.

When the signal $sel_i$ assumes the value 1, the nodes b and c assume the value 0, with the result that the value of the signal $req_i$ returns to 0 and the signal $c_j$ assumes the value 1. If the signal $sel_i$ assumes the value 0, the value of the node c returns to 1 with the result that the signal $c_j$ assumes the value 0. The value of the node b then being 0, for as long as the signal comp remains at 1, the value of the node c cannot return to 0 at the time of a subsequent activation of the node $sel_i$.

The decision electronic circuits 20 of all the pixels of the same row of the matrix are connected to the same output $req_i$. Similarly, the decision electronic circuits 20 of all the pixels of the same column of the matrix are connected to the same output $c_j$.

It is clear that an information reading method of the invention and its implementation in a device as described above solve the problem of collisions for a set of electronic components connected to a communication bus and having to send values that they hold at certain times.

This device solves the problem of collisions, but additionally, thanks to the circulation of a token, ensures that all the components holding a value to be sent are selected to send their value over the communication bus.

The invention is not limited to the embodiment described above, which explains the invention in a particular application to reading values contained in a matrix of pixels followed by sending the read values using a time coding process.

The invention applies more generally to any device including electronic components connected to a communication bus in which the electronic components are liable to hold values to be sent over the communication bus.

The invention claimed is:

1. A device for reading information in at least one set of electronic components connected to a communication bus in order to send said information over said communication bus, said device including:
  a sensor for reading values held in at least some of said electronic components holding a value to be sent and
  an arbiter circuit for successively sending the read values over said communication bus, wherein when the electronic components are arranged in one set, the arbiter circuit includes at least one plurality of processing blocks allocated respectively to each of said electronic components, and when the electronic components are arranged in a plurality of sets, the arbiter circuit includes at least one plurality of processing blocks allocated to each of said sets of electronic components, and
  wherein the processing blocks of each of said plurality of processing blocks are arranged such that, in the course of a transmission of the said values, said processing blocks transfer from one block to a following block of said plurality of processing blocks a unique authorization signal for the transmission of the read value, said authorization signal being capable, when passing from one processing block to the following block, of detecting those among said one set of electronic components or plurality of sets of electronic components associated with said plurality of processing blocks which have an item of information to transmit and of causing, where applicable, the successive transmission of said information to said communication bus.

2. An information reading device according to claim 1, wherein each plurality of processing blocks is arranged according to the configuration of a shift register.

3. An information reading device according to claim 2, wherein said electronic components constitute a matrix in which each row and each column forms one of said sets of electronic components and said arbiter circuit includes a vertical shift register including a processing block for each row of said matrix and a horizontal shift register including a processing block for each column of said matrix.

4. An information reading device according to claim 3, wherein each processing block includes an indicator of a value to be sent which takes a predetermined value if the corresponding processing block has a value to be sent, so that said authorization signal goes, on each rising edge of a clock signal provided by said arbiter circuit, from a block which has sent a value to a next block which has a value to be sent.

5. A device for reading information in at least one set of electronic components connected to a communication bus according to a predetermined order in order to send said information over said communication bus, said device including:
  a sensor for reading values held in at least some of said electronic components holding a value to be sent and
  an arbiter circuit for successively sending the read values over said communication bus, wherein when the electronic components are arranged in one set, the arbiter circuit includes at least one plurality of processing blocks allocated respectively to each of the said electronic components, and when the electronic components are arranged in a plurality of sets, the arbiter circuit includes at least one plurality of processing blocks allocated to each of the said sets of electronic components,
  wherein the processing blocks of each of the said plurality of processing blocks are arranged such that, in the course of a transmission of said values, said processing blocks transfer systematically and sequentially from one processing block to a following processing block of said plurality of processing blocks, from the beginning to the end of said set of electronic components in said predetermined order, a unique authorization signal for the transmission of the read value, said authorization signal being capable, when passing from one processing block to the following processing block, of detecting those among said one set of electronic components or plurality of sets of electronic components associated with said plurality of processing blocks which have an item of information to transmit and of causing, where applicable, the successive transmission of said information to said communication bus.

6. A device for reading information in a matrix of electronic components connected to a communication bus in order to send said information over said communication bus, said device including:
  a sensor for reading values held in at least some of said electronic components holding a value to be sent and
  an arbiter circuit for successively sending the read values over said communication bus, wherein the arbiter circuit includes at least one plurality of processing blocks allocated respectively to each row and to each column of said matrix, and
  wherein the processing blocks of each of said plurality of processing blocks are arranged such that, in the course of a transmission of the said values, said processing blocks transfer from one processing block allocated to a row to the processing block allocated to a following row, and then for each row from one processing block allocated to a column to the processing block allocated to a following column, a unique authorization signal for the transmission of the read value, said authorization signal being capable, when passing from one processing block to the following block, of detecting those among said row or column of electronic components associated with said plurality of processing blocks which have an item of information to transmit and of causing, where applicable, the successive transmission of the said information to said communication bus.

7. A method of reading information in at least one set of electronic components connected to a communication bus in order to send said information over said communication bus, using an arbiter circuit, wherein when the electronic components are arranged in one set, the arbiter circuit includes at least one plurality of processing blocks allocated respectively to each of said electronic components and, when the electronic components are arranged in a plurality of sets, the arbiter circuit includes at least one plurality of processing blocks allocated to each of said sets of electronic components, said method including:
  reading values contained in at least some of said electronic components holding a value to be sent,
  an arbitration for successively sending the read values over said communication bus, and
  in the course of a transmission of the said values, transferring from one block to a following block of the at least one of said plurality of processing blocks a unique authorization signal for the transmission of the read value, said authorization signal being capable, when passing from one processing block to the following block, of detecting successively in each of said processing blocks, in the course of the passage of said authorization signal, those among said one set of electronic components or plurality of sets of electronic components associated with said plurality of processing blocks which have an item of information to transmit and of causing, where applicable, the successive transmission of said information to said communication bus.

8. An information reading method according to claim 7, further comprising:

comparing a value held in each electronic component to a time reference signal in the form of a decreasing ramp;

generating a request for a value to be sent for an electronic component if at a given time the value of said time reference signal is equal to said value held in said electronic component;

said authorization signal causing said transmission for the electronic components for which a request for a value to be sent is generated; and wherein the value of said time reference signal is maintained constant, as long as said authorization signal is not passed among all the processing blocks associated respectively with said electronic components.

9. Application of a reading method according to claim 8 to reading information contained in a matrix of pixels each of which constitutes an electronic component of said matrix, wherein said transfer of said authorization signal is performed from row to row of said matrix, and then for each row from column to column of said matrix.

10. Application of a reading method according to claim 7 to reading information contained in a matrix of pixels each of which constitutes an electronic component of said matrix, wherein said transfer of said authorization signal is performed from row to row of said matrix, and then for each row from column to column of said matrix.

11. A method of reading information in at least one set of electronic components connected to a communication bus according to a predetermined order in order to send said information over said communication bus, using an arbiter circuit, wherein when the electronic components are arranged in one set, the arbiter circuit includes at least one plurality of processing blocks allocated respectively to each of said electronic components and, when the electronic components are arranged in a plurality of sets, the arbiter circuit includes at least one plurality of processing blocks allocated to each of said sets of electronic components, said method including:

reading values contained in at least some of said electronic components holding a value to be sent, and an arbitration for successively sending the read values over said communication bus, in the course of a transmission of the said values, transferring systematically and sequentially, from one block to a following block of the at least one of said plurality of processing blocks, and from the beginning to the end of said set of electronic components in said predetermined order, a unique authorization signal for the transmission of the read value, said authorization signal being capable, when passing from one processing block to the following block, of detecting successively in each of said processing blocks, in the course of the passage of said signal for the authorization of the transmission of values, those among said one set of electronic components or plurality of sets of electronic components associated with said plurality of processing blocks which have an item of information to transmit and of causing, where applicable, the successive transmission of said information to said communication bus.

\* \* \* \* \*